US010691886B2

(12) United States Patent
Yu et al.

(10) Patent No.: US 10,691,886 B2
(45) Date of Patent: Jun. 23, 2020

(54) ELECTRONIC APPARATUS FOR COMPRESSING LANGUAGE MODEL, ELECTRONIC APPARATUS FOR PROVIDING RECOMMENDATION WORD AND OPERATION METHODS THEREOF

(71) Applicant: SAMSUNG ELECTRONICS CO., LTD., Suwon-si, Gyeonggi-do (KR)

(72) Inventors: Seung-hak Yu, Yongin-si (KR); Nilesh Kulkarni, Suwon-si (KR); Hee-jun Song, Seoul (KR); Hae-jun Lee, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 138 days.

(21) Appl. No.: 15/888,442

(22) Filed: Feb. 5, 2018

(65) Prior Publication Data
US 2018/0260379 A1    Sep. 13, 2018

Related U.S. Application Data

(60) Provisional application No. 62/469,089, filed on Mar. 9, 2017.

(30) Foreign Application Priority Data

Nov. 8, 2017  (KR) .................. 10-2017-0147922

(51) Int. Cl.
*G06F 40/284*    (2020.01)
*G06F 40/211*    (2020.01)
(Continued)

(52) U.S. Cl.
CPC ............ *G06F 40/20* (2020.01); *G06F 40/216* (2020.01); *G06N 3/04* (2013.01); *G06N 3/0445* (2013.01); *G06N 3/08* (2013.01); *G06N 5/022* (2013.01)

(58) Field of Classification Search
CPC ...... G06F 17/27; G06F 17/20; G06F 17/2705; G06F 17/271; G06F 17/2715;
(Continued)

(56) References Cited

U.S. PATENT DOCUMENTS 9,400,955 B2   7/2016  Garimella
9,530,400 B2   12/2016 Lainez et al.
(Continued)

FOREIGN PATENT DOCUMENTS

KR    10-1646461    8/2016

OTHER PUBLICATIONS

Wang et al., Deep Learning at Scale and at Ease, ACM Transactions on Multimedia Computing, Communications, and Applications (TOMM), V12, pp. 1-25 (Year: 2016).*

(Continued)

*Primary Examiner* — Lamont M Spooner
(74) *Attorney, Agent, or Firm* — Nixon & Vanderhye P.C.

(57) ABSTRACT

An electronic apparatus for compressing a language model is provided, the electronic apparatus including a storage configured to store a language model which includes an embedding matrix and a softmax matrix generated by a recurrent neural network (RNN) training based on basic data including a plurality of sentences, and a processor configured to convert the embedding matrix into a product of a first projection matrix and a shared matrix, the product of the first projection matrix and the shared matrix having a same size as a size of the embedding matrix, and to convert a transposed matrix of the softmax matrix into a product of a second projection matrix and the shared matrix, the product of the second projection matrix and the shared matrix having a same size as a size of the transposed matrix of the softmax matrix, and to update elements of the first projection matrix, the second projection matrix and the shared matrix by
(Continued)

performing the RNN training with respect to the first projection matrix, the second projection matrix and the shared matrix based on the basic data.

19 Claims, 9 Drawing Sheets

(51) Int. Cl.
*G06F 40/20* (2020.01)
*G06N 3/04* (2006.01)
*G06N 3/08* (2006.01)
*G06F 40/216* (2020.01)
*G06N 5/02* (2006.01)

(58) Field of Classification Search
CPC .. G06F 17/272; G06F 17/2725; G06F 17/273; G06F 17/2735; G06F 17/274; G06F 17/2745; G06F 17/275; G06F 17/2755; G06F 17/276; G06F 17/2765; G06F 17/277; G06F 17/2775; G06F 17/278; G06F 17/2785; G06F 17/2795
USPC .................................. 704/1, 9, 10
See application file for complete search history.

(56) References Cited

U.S. PATENT DOCUMENTS

| | | | | |
|---|---|---|---|---|
| 10,109,275 B2 * | 10/2018 | Henry | | G06F 40/216 |
| 10,140,980 B2 * | 11/2018 | Bengio | | G10L 15/16 |
| 2008/0159622 A1 * | 7/2008 | Agnihotri | | G06K 9/00228 382/157 |
| 2012/0150532 A1 * | 6/2012 | Mirowski | | G06F 40/40 704/9 |
| 2012/0233127 A1 * | 9/2012 | Solmer | | G06F 16/93 707/661 |
| 2014/0019388 A1 * | 1/2014 | Kingsbury | | G06N 20/00 706/12 |
| 2014/0156575 A1 * | 6/2014 | Sainath | | G06N 7/005 706/16 |
| 2014/0372112 A1 | 12/2014 | Xue et al. | | |
| 2016/0217369 A1 | 7/2016 | Annapureddy et al. | | |
| 2016/0321541 A1 | 11/2016 | Liu et al. | | |
| 2016/0322042 A1 | 11/2016 | Vlietinck et al. | | |
| 2017/0053646 A1 | 2/2017 | Watanabe et al. | | |
| 2017/0127016 A1 * | 5/2017 | Yu | | G06N 3/084 |
| 2017/0150235 A1 * | 5/2017 | Mei | | G06K 9/00718 |
| 2017/0270100 A1 * | 9/2017 | Audhkhasi | | G06F 40/30 |
| 2018/0068652 A1 * | 3/2018 | Yong | | G10L 15/183 |
| 2018/0114108 A1 * | 4/2018 | Lao | | G06N 3/006 |
| 2018/0121799 A1 * | 5/2018 | Hashimoto | | G06N 3/0454 |
| 2018/0150143 A1 * | 5/2018 | Orr | | G06N 3/04 |
| 2018/0150743 A1 * | 5/2018 | Ma | | G06N 3/084 |
| 2018/0150744 A1 * | 5/2018 | Orr | | G06N 3/0454 |
| 2018/0165554 A1 * | 6/2018 | Zhang | | G06K 9/6269 |
| 2018/0174579 A1 * | 6/2018 | Henry | | G06F 40/289 |
| 2018/0189236 A1 * | 7/2018 | Korthikanti | | G06F 17/16 |
| 2018/0232443 A1 * | 8/2018 | Delgo | | G06Q 30/06 |
| 2018/0357240 A1 * | 12/2018 | Miller | | G06F 16/3329 |

OTHER PUBLICATIONS

Anonymous, "Embedded Deep Learning Based Word Prediction", EMNLP 2016, Submission, 5 pages.
International Search Report dated Jun. 5, 2018 issued in PCT International Patent Application No. PCT/KR2018/001611, 4 pp.
Written Opinion dated Jun. 5, 2018 issued in PCT International Patent Application No. PCT/KR2018/001611, 6 pp.
Li, Xiang et al., "LightRNN: Memory and Computation-Efficient Recurrent Neural Networks," 30th Conference on Neural Information Processing Systems (NIPS 2016), Barcelona, Spain, Oct. 31, 2016, pp. 1-9.
Chen, Yunchuan et al., "Compressing Neural Language Models by Sparse Word Representations," Proceedings of the 54th Annual Meeting of the Association for Computational Linguistics, Berlin, Germany, Aug. 7-12, 2016, pp. 226-235.
Chen, Wenlin et al., "Strategies for Training Large Vocabulary Neural Language Models," Proceedings of the 54th Annual Meeting of the Association for Computational Linguistics, Berlin, Germany, Aug. 7-12, 2016, pp. 1975-1985.
Jurdziński, Grzegorz, "Word Embeddings for Morphologically Complex Languages," Schedae Informaticae vol. 25, Dec. 30, 2016, pp. 127-138.
EP Office Action dated Jan. 27, 2020 for EP Application No. 18763492.8.
Distilling the Knowledge in a Neural Network; Hinton et al., CORR (ARVIX), vol. 1503; Mar. 9, 2015.
On the Compression of Recurrent Neural Networks with an Application to LVCSR Acoustic Modeling for Embedded Speech Recognition; ROHIT et al., 2016 IEEE International Conference; Mar. 20, 2016.
Reconstructing of Deep Neural Network Acoustic Models with Singular Value Decomposition, Proc. Interspeech, Jian Xue et al., Aug. 25, 2013.
Low-Rank Matrix Factorization for Deep Neural Network Training with High Dimensional Output Targets; Sainath Tara et al., ICASSP, IEEE International Conference on Acoustics, Speech and Signal Processing Proceedings, 1999 IEEE, May 26, 2013.
Tying Word Vectors and Word Classifiers: A Loss Framework for Language Modeling, Hakan Inan et al., Nov. 4, 2016.
Using the Output Embedding to Improve Language Models, OFIR PRESS et al., Proceedings of the 15th Conference of the European Chapter of the Association for Computational Linguistics, vol. 2, Short Papers, Feb. 21, 2017.

* cited by examiner

FIG. 3B

```
I hope I shall succeed this time.
I am sick of the work.
I did the little that I could.
I am covetous of power.
I am tired out.
```

FIG. 5

| Model | PP | Size | CR |
| --- | --- | --- | --- |
| Baseline | 56.55 | 56.76 | - |
| +KD | 55.76 | 56.76 | - |
| +Shared Matrix | 55.07 | 33.87 | 1.68x |
| +Low-Rank, Retrain | 59.78 | 14.80 | 3.84x |
| +Quantization | 59.78 | 7.40 | 7.68x |

ELECTRONIC APPARATUS FOR COMPRESSING LANGUAGE MODEL, ELECTRONIC APPARATUS FOR PROVIDING RECOMMENDATION WORD AND OPERATION METHODS THEREOF

CROSS-REFERENCE TO RELATED APPLICATIONS

This application is based on and claims priority under 35 U.S.C. § 119 to Korean Patent Application No. 10-2017-0147922, filed in the Korean Intellectual Property Office on Nov. 8, 2017, and U.S. Provisional Patent Application No. 62/469,089, filed in the U.S. Patent and Trademark Office on Mar. 9, 2017, the disclosures of which are incorporated by reference herein in their entireties.

BACKGROUND

1. Field

The present disclosure relates to an electronic apparatus for compressing a language model in an artificial intelligence (AI) system which mimics the function of a human brain, such as cognition, judgement, etc. using a machine learning algorithm such as a deep-learning, etc. while applying the system, an electronic apparatus for providing a recommended word, and an operation method thereof, for example, to an electronic apparatus for compressing a language model based on a language model on which a recurrent neural network (RNN) training is performed, an electronic apparatus for providing a recommended word, and an operation method thereof.

2. Description of Related Art

An artificial intelligence (AI) system is a computer system which embodies an intelligence equivalent to a human intelligence, and unlike the rule-based smart system, the AI system becomes intelligent by training and determining by itself. The more the AI system is used, the more the recognition rate of the system improves, and the system becomes capable of understanding a user preference more accurately. Accordingly, the rule-based smart system has been replaced with the deep-learning-based AI system.

The AI technique may be configured with a machine learning (deep-learning) and the element techniques which utilize the machine learning.

Machine learning refers to an algorithm technique which classifies and learns the characteristic of input data by itself, and the element technique is a replication technique which replicates the function of a human brain, such as cognition, judgement of a human brain, using a machine learning algorithm such as a deep-learning, and the element technique includes the technical fields of a linguistic understanding, a visual understanding, an inference/prediction, a knowledge expression, an operation control, etc.

The AI technique is used and applied in various fields. The technique of linguistic understanding may relate to recognizing a human language/text and applying/processing the language/text, and the technique may include a natural word processing, a machine translation, a dialogue system, answering a question, a voice recognition/composition, etc. The technique of visual understanding may relate to recognizing an object as a human sense of sight, and the technique may include recognizing an object, tracing an object, searching for an image, recognizing a person, understanding a scene, understanding a space, upgrading an image, etc. The technique of inference and prediction may relate to determining, logically inferring and predicting information, and the technique may include an inference based on knowledge/probability, a prediction of optimization, a preference-based plan, a recommendation, etc. The technique of knowledge expression may refer to an automated processing of human experience information into knowledge data, and may include establishment of knowledge (generation/classification of data), management of knowledge (utilization of data), etc. The technique of operation control may refer to a control of autonomous navigation of a vehicle, a motion of a robot, etc., and may include a motion control (navigation, collision, driving, etc.), a manipulation control (a behavior control), etc.

For example, the AI system may learn a variety of sentences, and the system may be applied to generation of a language model in accordance with the result of the learning. Also, the AI system may provide a new word or complete a sentence by a similar process to the process of the learning based on the generated language model.

Such a language model may be generated based on the learning of huge number of sentences, and the higher the dimension of the language model, the more the completeness may improve. However, if the dimension of the language model becomes higher, the amount of data of the language model may increase exponentially, and it may be difficult to use the language model in the device which does not have an enough storage space. Further, if the level of dimension is lowered to generate a language model used in the device which does not have an enough storage space, the performance may also be lowered. Accordingly, the method for reducing the amount of data with minimizing and/or reducing the performance degradation of the language model has been needed.

SUMMARY

In accordance with an aspect of example embodiments of the present disclosure relate to an electronic apparatus which compresses a language model on which an RNN training is performed without performance degradation, an electronic apparatus which provides a recommended word based on a compressed language model, and an operation method thereof.

According to an example embodiment, an electronic apparatus is provided, the electronic apparatus comprises a storage configured to store a language model including an embedding matrix and a softmax matrix generated by a recurrent neural network (RNN) training based on basic data including a plurality of sentences, and a processor configured to convert the embedding matrix into a product of a first projection matrix and a shared matrix, the product having a same size as a size of the embedding matrix, and to convert a transposed matrix of the softmax matrix into a product of a second projection matrix and the shared matrix, the product having a same size as a size of the transposed matrix of the softmax matrix, and to update elements of the first projection matrix, the second projection matrix and the shared matrix by performing the RNN training with respect to the first projection matrix, the second projection matrix and the shared matrix based on the basic data.

The processor may calculate (determine) a word perplexity with respect to the first projection matrix, the second projection matrix and the shared matrix based on a test module, in response to the word perplexity being equal to or greater than a predetermined value, obtain a new shared matrix having a size larger than a size of the shared matrix, and in response to the word perplexity being lower than the predetermined value, obtain a new shared matrix having a size smaller than a size of the shared matrix, and recalculate the first projection matrix, the second projection matrix and the shared matrix using the obtained new shared matrix.

The processor may calculate (determine) a reference word perplexity with respect to the embedding matrix and the softmax matrix based on the text module and to determine the predetermined value based on the reference word perplexity.

The processor may recalculate (redetermine) the first projection matrix, the second projection matrix and the shared matrix using a shared matrix of a smallest size among a plurality of shared matrices of which word perplexities are lower than the predetermined value and generate a compressed language model based on the recalculated first projection matrix, second projection matrix and shared matrix.

The processor may convert the shared matrix into a first matrix, a second matrix and a third matrix using a singular value decomposition (SVD), update elements of the first projection matrix, the second projection matrix, the first matrix, the second matrix and the third matrix by performing the RNN training with respect to the first projection matrix, the second projection matrix, the first matrix, the second matrix and the third matrix based on the basic data, and generate a compressed language model based on the first projection matrix, the second projection matrix, the first matrix, the second matrix and the third matrix of which elements are updated.

The processor may obtain first data in which a first vector corresponding to a first word included in one of the plurality of sentences is mapped to a vector space based on a first random matrix, and in response to an input of a second word which is included in the sentence and is subsequent to the first word, obtain second data in which a second vector corresponding to the second word is mapped to the vector space based on the first random matrix, and generate third data based on the first data and the second data, obtain a recovery vector from the third data based on the second random matrix, update elements of the first random matrix and the second random matrix based on a difference between the recovery vector and a third vector corresponding to a third word subsequent to the second word and perform a training.

The processor may update elements of the first random matrix and the second random matrix based on the remaining sentences of the plurality of sentences, and store the first random matrix and the second random matrix of which elements are updated based on the remaining sentences in the storage as the embedding matrix and the softmax matrix.

Transposed matrices of the embedding matrix and the softmax matrix may have a same size.

According to an example embodiment, an electronic apparatus for providing a recommended word is provided, the electronic apparatus comprising a storage configured to store a language model including a first projection matrix, a first matrix, a second matrix, and a third matrix which are used as an embedding matrix, and a second projection matrix, the first matrix, the second matrix, and the third matrix which are used as a softmax matrix, and a processor configured to, in response to an input of a first word, obtain first data in which a first vector corresponding to the first word is mapped to a vector space based on the first projection matrix, the first matrix, the second matrix, and the third matrix, obtain a second vector from the first data based on the second projection matrix, the first matrix, the second matrix, and the third matrix, and provide a recommended word based on the second vector.

The processor may, in response to an input of a second word after the first word is input, obtain second data in which a third vector corresponding to the second word is mapped to the vector space based on the first projection matrix, the first matrix, the second matrix, and the third matrix, and generate third data based on the first data and the second data, obtain a fourth vector from the third data based on the second projection matrix, the first matrix, the second matrix, and the third matrix, and provide the recommended word based on the fourth vector.

According to an example embodiment, an operation method for compressing a language model of an electronic apparatus in which a language model which includes an embedding matrix and a softmax matrix generated by a recurrent neural network (RNN) training based on basic data including a plurality of sentences is stored is provided, the operation method comprising converting the embedding matrix into a product of a first projection matrix and a shared matrix, the product having a same size as a size of the embedding matrix, and convert a transposed matrix of the softmax matrix into a product of a second projection matrix and the shared matrix, the product having a same size as a size of the transposed matrix of the softmax matrix, and updating elements of the first projection matrix, the second projection matrix and the shared matrix by performing the RNN training with respect to the first projection matrix, the second projection matrix and the shared matrix based on the basic data.

The method may further include calculating (determining) a word perplexity with respect to the first projection matrix, the second projection matrix and the shared matrix based on a test module, in response to the word perplexity being equal to or greater than a predetermined value, obtaining a new shared matrix having a size larger than a size of the shared matrix, and in response to the word perplexity being lower than the predetermined value, obtaining a new shared matrix having a size smaller than a size of the shared matrix, and recalculating the first projection matrix, the second projection matrix and the shared matrix using the obtained new shared matrix.

The method may further include calculating (determining) a reference word perplexity with respect to the embedding matrix and the softmax matrix based on the text module, and determining the predetermined value based on the reference word perplexity.

The method may further include recalculating (redetermining) the first projection matrix, the second projection matrix and the shared matrix using a shared matrix of a smallest size among a plurality of shared matrices of which word perplexities are lower than the predetermined value, and generating a compressed language model based on the recalculated first projection matrix, second projection matrix and shared matrix.

The method may further include converting the shared matrix into a first matrix, a second matrix and a third matrix using a singular value decomposition (SVD), updating elements of the first projection matrix, the second projection matrix, the first matrix, the second matrix and the third matrix by performing the RNN training with respect to the first projection matrix, the second projection matrix, the first matrix, the second matrix and the third matrix based on the basic data, and generating a compressed language model based on the first projection matrix, the second projection matrix, the first matrix, the second matrix and the third matrix of which elements are updated.

The method may further include obtaining first data in which a first vector corresponding to a first word included in one of the plurality of sentences is mapped to a vector space based on a first random matrix, in response to an input of a second word which is included in the sentence and is subsequent to the first word, obtaining second data in which a second vector corresponding to the second word is mapped to the vector space based on the first random matrix, generating third data based on the first data and the second data, obtaining a recovery vector from the third data based on the second random matrix, and updating elements of the first random matrix and the second random matrix based on a difference between the recovery vector and a third vector corresponding to a third word subsequent to the second word, and performing a training.

The method may further include updating elements of the first random matrix and the second random matrix based on the remaining sentences of the plurality of sentences, and storing the first random matrix and the second random matrix of which elements are updated based on the remaining sentences in the storage as the embedding matrix and the softmax matrix.

Transposed matrices of the embedding matrix and the softmax matrix have a same size.

According to an example embodiment, an operation method for providing a recommended word of an electronic apparatus in which a language model which includes a first projection matrix, a first matrix, a second matrix, and a third matrix which are used as an embedding matrix, and a second projection matrix, the first matrix, the second matrix, and the third matrix which are used as a softmax matrix is stored is provided, the operation method comprising, in response to an input of a first word, obtaining first data in which a first vector corresponding to the first word is mapped to a vector space based on the first projection matrix, the first matrix, the second matrix, and the third matrix, obtaining a second vector from the first data based on the second projection matrix, the first matrix, the second matrix, and the third matrix, and providing a recommended word based on the second vector.

The method may further include, in response to an input of a second word after the first word is input, obtaining second data in which a third vector corresponding to the second word is mapped to the vector space based on the first projection matrix, the first matrix, the second matrix, and the third matrix.

According to one or more example embodiments, the electronic apparatus may compress the data of a language model on which a recurrent neural network (RNN) training is performed, an electronic apparatus which has a relatively small storage space may store a compressed language model, and a recommended word based on the compressed language model may be provided with minimizing and/or reducing a performance degradation.

BRIEF DESCRIPTION OF THE DRAWINGS

The above and other aspects, features and attendant advantages of the present disclosure will become more apparent from the following detailed description, taken in conjunction with the accompanying drawings, in which like reference numerals refer to like elements, and wherein:

FIGS. 3A and 3B are diagrams illustrating an example of conventional RNN training;

FIG. 5 is a diagram illustrating a performance and a compression rate of a compressed language model according to an example embodiment;

DETAILED DESCRIPTION

Figure 1A:
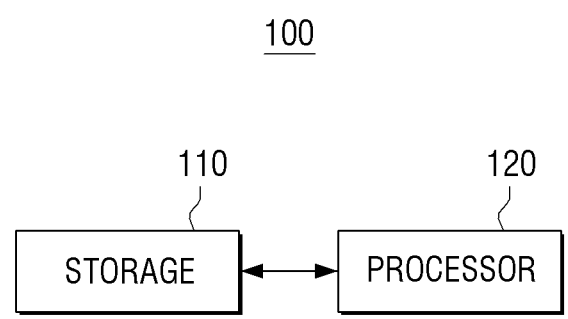
FIG. 1A is a block diagram illustrating an example of an electronic apparatus according to an example embodiment.

The example embodiments of the present disclosure may be diversely modified. Accordingly, specific example embodiments are illustrated in the drawings and are described in greater detail in the detailed description. However, it is to be understood that the present disclosure is not limited to a specific example embodiment, but includes all modifications, equivalents, and substitutions without departing from the scope and spirit of the present disclosure. Also, well-known functions or constructions may not be described in detail if they would obscure the disclosure with unnecessary detail.

Hereinafter, various example embodiments will be described in greater detail with reference to the accompanying drawings.

FIG. 1A is a block diagram illustrating an electronic apparatus 100 in accordance with an example embodiment. As illustrated in FIG. 1A, the electronic apparatus 100 may include a storage 110 and a processor (e.g., including processing circuitry) 120.

The electronic apparatus 100 may be capable of an artificial intelligence training. For example, the electronic apparatus 100 may be implemented as, for example, and without limitation, a desktop PC, a laptop, a smartphone, a tablet PC, a server, or the like. The electronic apparatus 100 may also refer to a system in which a clouding computing environment is established. However, the example embodiments are not limited thereto. The electronic apparatus 100 may be implemented as any apparatus which is capable of an artificial intelligence training.

The storage 110 may store a language model. The language model may, for example, be the data created by modeling the language that a user actually uses, such as sentences, phrases, or the like. Using the language model, the most appropriate recommended word may be provided as a word subsequent to an input word based on sequentially input words.

The storage 110 may store basic data including a plurality of sentences. The basic data may be the data required to generate a language model. In other words, the language model may be generated by training with respect to the basic data.

The storage 110 may store a language model before compression. The storage 110 may also store a language model compressed by the processor 120 which will be described in greater detail below.

The storage 110 may store the language model which includes an embedding matrix and a softmax matrix generated by a recurrent neural network (RNN) training based on basic data which includes a plurality of sentences. The RNN may be one kind of a deep-learning model for learning data which changes following a current of time, such as time-series data. The method of RNN training will be described in greater detail with an embedding matrix and a softmax matrix below.

The processor may include various processing circuitry and control overall operations of the electronic apparatus 100.

According to an example embodiment, the processor 120 may be implemented, for example, and without limitation, as a digital signal processor (DSP), a microprocessor, or a time controller (TCON), or the like, but is not limited thereto. The processor may, for example, and without limitation, be one or more of a dedicated processor, a central processing unit (CPU), a micro controller unit (MCU), a micro processing unit (MPU), a controller, an application processor (AP), a communication processor (CP), an ARM processor, or the like, or may be defined as one of the terms above. Also, the processor 140 may be implemented as a system on chip (SoC) in which a processing algorithm is provided, or be implemented in a form of a field programmable gate array (FPGA), or the like, but is not limited thereto.

The processor 120 may generate a language model before compression and store the language model in the storage 110. The processor 120 may also receive a language model before compression which is generated by an external apparatus and store the language model in the storage 110. For ease of description, the method for generating a language model through an RNN training will be described in addition to the description for an embedding matrix and a softmax matrix, and the method for compressing a language model will also be described.

The processor 120 may obtain the first data in which a first vector corresponding to a first word included in one of the plurality of sentences stored in the storage 110 is mapped to a vector space based on the first random matrix. For example, the one of the sentences may be "I am a boy," and the first word may be "I."

The vector which corresponds to the word may have the size of '1×m,' and 'm' may be determined based on the type of word included in the basic data. For example, if there are 15,000 words which are different from one another, the size of the vector may be '1×15000.' Also, only one of the values of the 15,000 columns of the vector may be '1' and the values of the remaining columns may be 0, and the word may be determined based on the position of the column of which the value is '1.' For instance, if the value of the first column of the 15,000 columns is '1,' it may indicate the word "I," and if the value of the second column of the 15,000 columns is '2,' it may indicate the word "you." The processor 120 may obtain the first vector which corresponds to the first word by the above method.

The first random matrix may have the size of 'm×n' and have random elements, and may be for mapping the first vector to a vector space of an n-dimension. In other words, the processor 120 may obtain the first data in which the first vector is mapped to the n-dimensional vector space by multiplying the first vector by the first random matrix.

If the second word which is included in the same sentence and is subsequent to the first word is input, the processor 120 may obtain the second data in which the second vector which corresponds to the second word is mapped to a vector space based on the first random matrix. In the above example, the processor 120 may obtain the second data in which the second vector corresponding to the second word "am" is mapped to the n-dimensional vector space by multiplying the second vector by the first random matrix.

The processor 120 may generate the third data based on the first data and the second data. For example, the processor 120 may generate the third data based on the first data and the second data by the long-short term memory (LSTM) method. The LSTM method is a prior art, and thus, the detailed description thereof will not be provided. The processor 120 may also generate the third data based on the weighted sum of the first data and the second data.

The processor 120 may obtain a recovery vector from the third data based on the second random matrix. The second random matrix may have the size of 'n×m' and have random elements, and may be for recovering the data mapped to an n-dimension to a vector. Accordingly, the size of the transposed matrix of the first random matrix may be the same as the size of the transposed matrix of the second random matrix.

The recovery vector may have the size of '1×m.' The value of each column may be between 0 and 1, and the sum of the values of all the columns may be ' 1.'

The processor 120 may update the elements of the first random matrix and the second random matrix based on the difference between the recovery vector and the third vector which corresponds to the third word subsequent to the second word, and perform a training. In the above example, the third word may be "a," and the processor 120 may update the elements of the first random matrix and the second random matrix such that the recovery vector is recovered to the third vector which correspond to the third word "a."

The processor 120 may perform the above process for each sentence. For example, the processor 120 may receive the words "I am a," map each of the words to an n-dimension, recover the weighted sum data and obtain the recovery vector, update the elements of the first random matrix and the second random matrix based on the difference between the recovery vector and the fourth vector which corresponds to the word "boy," and perform the training based on the updated elements. In other words, the processor 120 may perform the training based on more number of words included in one sentence than two words. The processor 120 may also perform the training based on one word.

The processor 120 may complete the training related to one sentence and perform another training related to another sentence by the above method. In this case, the processor 120 may not consider the previous sentence to which the training is completed. In other words, the processor 120 may perform the training sentence by sentence, and the training related to the relationship between the words in one sentence may be performed by various methods.

The processor 120 may update each of the elements of the first random matrix and the second random matrix based on the remaining sentences of a plurality of sentences. If the processor 120 completes the training related to one sentence, the processor 120 may perform the training related to the other sentences included in basic data, and the processor 120 may perform the above process for every sentence.

The processor 120 may store in the storage 110 the first random matrix and the second random matrix, the elements of which are updated based on the remaining sentences, as an embedding matrix and a softmax matrix, respectively. In other words, once the training related to all the sentences included in the basic data is completed, the first random matrix and the second random matrix may be stored in the storage 110 as an embedding matrix and a softmax matrix, respectively.

The sizes of the transposed matrices of the embedding matrix and the softmax matrix may be the same. Also, the transposed matrices of the embedding matrix and the softmax matrix may have different corresponding elements. Accordingly, even if one same word is input, the recommended word may be different.

The embedding matrix and the softmax matrix may be used as a language model for recommending a word. For example, if a user inputs the word "I," the processor 120 may obtain the first data in which the first vector corresponding to the word "I" is mapped to a vector space based on the embedding matrix, generate the first recovery vector from the first data based on the softmax matrix, and provide a recommended word based on the first recovery vector.

For example, the processor 120 may provide the word which corresponds to the column in which the greatest value among the values of the elements of the recovery vector is positioned as the first recommended word, and provide the word which corresponds to the column in which the second greatest value among the values of the elements of the recovery vector is positioned as the second recommended word. For instance, the processor 120 may provide the word "am" as the first recommended word, and recommend the word "was" as the second recommended word.

If a user inputs the words "am" and "a" sequentially, the processor 120 may obtain the second data and the third data in which the second vector corresponding to the word "am" and the third vector corresponding to the word "a" are mapped to a vector space based on the embedding matrix, and generate the fourth data based on the weighted sum of the first data, the second data, and the third data.

The processor 120 may generate the second recovery vector from the fourth data based on the softmax matrix, and provide a recommended word based on the second recovery vector.

For example, the processor 120 may provide the word which corresponds to the column in which the greatest value among the values of the elements of the second recovery vector is positioned as the first recommended word, and provide the word which corresponds to the column in which the second greatest value among the values of the elements of the second recovery vector is positioned as the second recommended word. For instance, the processor 120 may recommend the word "boy" as the first recommended word, and recommend the word "girl" as the second recommended word.

As described above, the processor 120 may perform the RNN training with respect to the basic data, obtain the embedding matrix and the softmax matrix, and generate a language model which includes the embedding matrix and the softmax matrix. When the language model is generated, the processor 120 may provide a recommended word based on the language model.

However, the size of the embedding matrix and the softmax matrix may be large. For example, if there are 15,000 different words in the basic data, and the vector space of 600 dimensions is used, the embedding matrix of the size of '15000×600' and the softmax matrix of the size of '600×15000' may be generated. In this case, 18,000,000 elements may need to be stored, and a large storage space may be necessary. If the number of dimensions is reduced, the number of elements which need to be stored may be reduced, but the performance of when recommending a word may be deteriorated as the learning ability is degraded.

Thus, the method for compressing a language model with minimizing and/or reducing the performance degradation will be described in greater detail below.

The processor 120 may convert the embedding matrix stored in the storage 110 into a product of the first projection matrix and a shared matrix, the product having the same size as the size of the embedding matrix, and convert the transposed matrix of the softmax matrix stored in the storage 110 into a product of the second projection matrix and the shared matrix, the product having the same size as the size of the transposed matrix of the softmax matrix.

For example, if the size of the embedding matrix is 'm×n,' the processor 120 may convert the embedding matrix into the first projection matrix of the size of 'm×l' and the shared matrix of the size of 'l×n.' The elements of the first projection matrix and of the shared matrix may be determined randomly, and the elements may be irrelevant to the elements of the embedding matrix.

If the size of the softmax matrix is 'n×m,' the processor 120 may convert the softmax matrix into the second projection matrix of the size of 'm×l' and the shared matrix of the size of 'l×n.' The elements of the second projection matrix and of the shared matrix may be determined randomly and the elements may be irrelevant to the elements of the softmax matrix.

For example, if the size of the embedding matrix is '15000×600' and the size of the softmax matrix is '600×15000,' the processor 120 may generate the first projection matrix of the size of '15000×100,' the second projection matrix of the size of '15000×100,' and the shared matrix of the size of '100×600.' In this case, the 18,000,000 elements of the embedding matrix and the softmax matrix may be reduced to 3,060,000 elements of the first projection matrix, the second projection matrix and the shared matrix. The smaller the 'l' is, the more the compression efficiency may increase.

The processor 120 may update the elements of the first projection matrix, the second projection matrix and the shared matrix by performing the RNN training with respect to the first projection matrix, the second projection matrix and the shared matrix based on the basic data. The updating method may be the same as the method for generating the embedding matrix and the softmax matrix described above.

The processor 120 may multiply the first projection matrix by the shared matrix and use the product as the first random matrix, and multiply the second projection matrix by the shared matrix and use the transposed matrix of the product as the second random matrix. The processor 120 may update the elements of the first projection matrix, the second projection matrix, and the shared matrix by performing the training with respect to all the sentences included in the basic data.

If the size of the shared matrix is small (that is, if 'l' is small), the performance of a language model may be degraded, and if the size of the shared matrix is large, the compression efficiency may be deteriorated. Accordingly, the shared matrix of an optimal size may need to be obtained to improve the compression efficiency with maintaining the performance of a language model. Therefore, the method for calculating a word perplexity and acquiring a shared matrix of an optimal size will be described below. The perplexity may refer, for example, to a criterion which indicates how successfully a probability distribution or a probability model predicts a sample, and the perplexity may be used in comparison of a probability model. The lower the perplexity, the more the prediction may be successful.

The processor 120 may calculate the word perplexity related to the first projection matrix, the second projection matrix, and the shared matrix based on a test module. The test module may refer to a module (e.g., including processing circuitry and/or program elements) for testing a language model, and there may be no limitation in the type of the module.

If the word perplexity is greater than a predetermined value, the processor 120 may obtain a new shared matrix having a size larger than the size of the shared matrix, and if the word perplexity is less than a predetermined value, the processor 120 may obtain a new shared matrix having a size smaller than the size of the shared matrix. Using the newly obtained shared matrix, the first projection matrix, the second projection matrix, and the shared matrix may be recalculated. The recalculation of the first projection matrix, the second projection matrix, and the shared matrix may indicate the updating of the elements by the training.

If the word perplexity of the shared matrix of the size of '100×600' is greater than a predetermined value, the processor 120 may obtain the shared matrix of the size of '110×600,' and if the word perplexity is less than the predetermined value, the processor 120 may obtain the shared matrix of the size of '90×600.' The above example in which the is 100 or 90 may be one example, and the may be set differently.

The processor 120 may calculate a reference word perplexity with respect to the embedding matrix and the softmax matrix based on a test module, and determine a predetermined value based on the reference word perplexity.

For example, the processor 120 may calculate the reference word perplexity related to the embedding matrix and the softmax matrix based on the same test module, and determine the reference word perplexity as the predetermined value.

The language model using the embedding matrix and the softmax matrix may be optimized for the determined dimension. Even if the dimension is the same, the performance of the language model which uses the shared matrix of which the value of 'l' is smaller than the rank of the embedding matrix and the softmax matrix may be further deteriorated than the performance of the language model which uses the embedding matrix and the softmax matrix. It may not be compulsory that the value of 'l' of the shared matrix should be greater than the rank of the embedding matrix and the softmax matrix, but if the value of 'l' is too small, the generated model may be too different from an optimal model. To address the above, the processor 120 may perform the training with respect to a plurality of shared matrices.

In other words, the processor may update the elements of the new shared matrix, and the first projection matrix and the second projection matrix, and recalculate the word perplexity. For example, the processor 120 may update the elements of a plurality of shared matrixes and of the first projection matrix and the second projection matrix which correspond to the plurality of shared matrixes, and calculate the word perplexity which corresponds to each of the plurality of shared matrixes.

The processor 120 may recalculate the first projection matrix, the second projection matrix and the shared matrix using the shared matrix of the smallest size among a plurality of shared matrixes, the word perplexities of which are lower than a predetermined value, and generate a compressed language model based on the recalculated first projection matrix, second projection matrix, and shared matrix.

As described above, the processor 120 may compress the data by changing the language model which includes the embedding matrix and the softmax matrix to the language model which includes the first projection matrix, the second projection matrix and the shared matrix. Also, the dimension of the language model including the embedding matrix and the softmax matrix may be the same as the dimension of the language model including the first projection matrix, the second projection matrix and the shared matrix, and by setting the size of the shared matrix appropriately, the compression efficiency may improve and the performance degradation may be minimized and/or reduced.

The processor 120 may convert the shared matrix into the first matrix, the second matrix, and the third matrix using a singular value decomposition (SVD). For example, the processor 120 may convert the shared matrix of the size of '1×n' into the first matrix of the size of '1×l,' the second matrix of the size of '1×r,' and the third matrix of the size of 'r×l.'

For example, the processor 120 may convert the shared matrix of the size of '100×600' into the first matrix of the size of '100×100,' the second matrix of the size of '100×20,' and the third matrix of the size of '20×600.' In this case, the number of 60,000 elements of the shared matrix may be reduced to 24,000 elements. In other words, the compression efficiency may improve by further decomposing the shared matrix once more.

The SVD may refer, for example, to a singular value decomposition, and as the singular value decomposition is a well-known technique, a detailed description thereof will not be provided. Also, the elements of the first matrix, the second matrix and the third matrix may be irrelevant to the shared matrix.

The processor 120 may update the elements of the first projection matrix, the second projection matrix, the first matrix, the second matrix and the third matrix by performing the RNN training with respect to the first projection matrix, the second projection matrix, the first matrix, the second matrix and the third matrix based on the basic data, and generate a compressed language model using the first projection matrix, the second projection matrix, the first matrix, the second matrix and the third matrix of which the elements are updated. The method for updating the elements by the training have already been described above, and thus, the detailed description thereof will not be repeated.

Figure 1B:
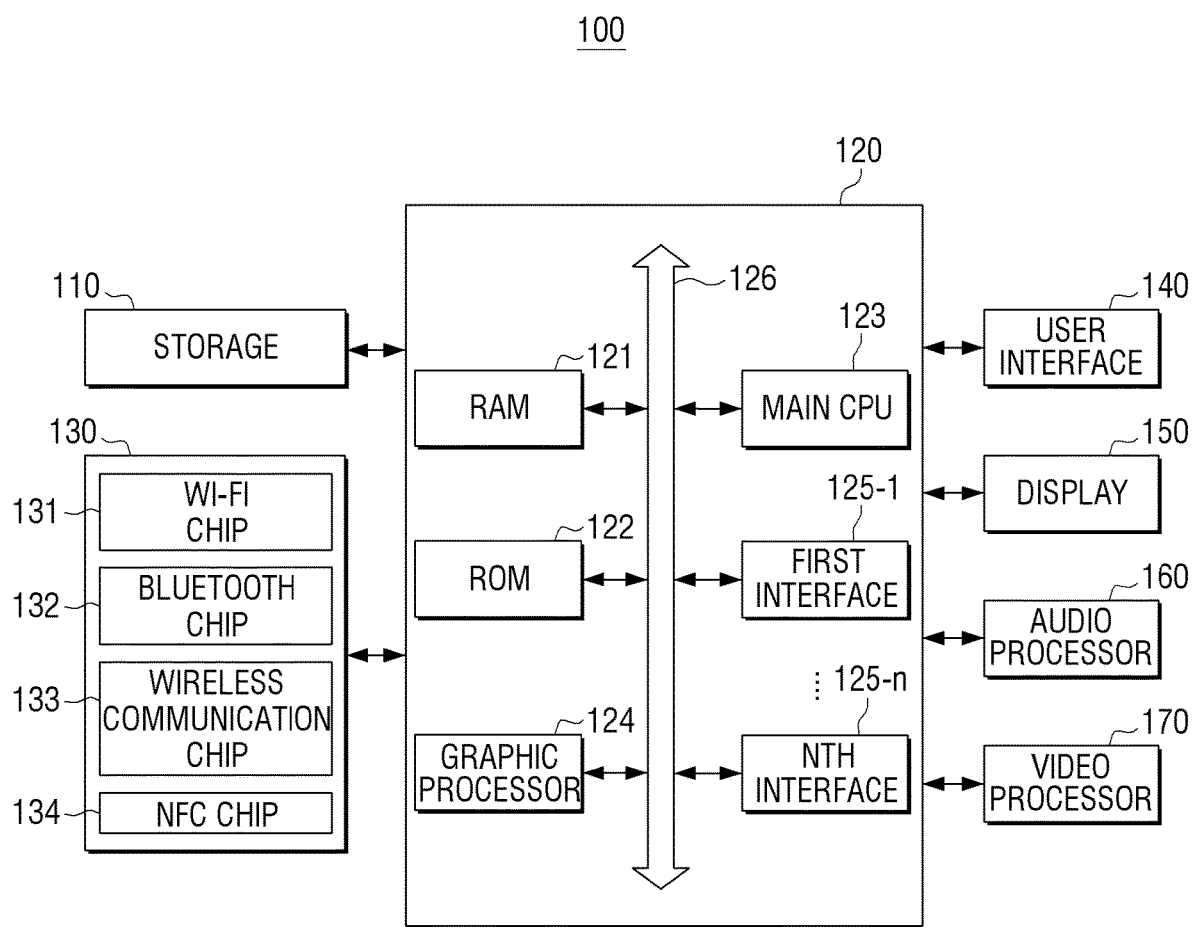
FIG. 1B is a block diagram illustrating an example configuration of an electronic apparatus according to an example embodiment.

FIG. 1B is a block diagram illustrating an example configuration of the electronic apparatus 100. According to FIG. 1B, the electronic apparatus 100 may include the storage 110, the processor (e.g., including processing circuitry) 120, a communicator (e.g., including communication circuitry) 130, a user interface (e.g., including interface circuitry) 140, a display 150, an audio processor (e.g., including audio processing circuitry) 160, and a video processor (e.g., including video processing circuitry) 170. The detailed description for the elements illustrated in FIG. 1B which are overlapped with the elements illustrated in FIG. 1A will not be repeated.

The processor 120 may include various processing circuitry and control overall operations of the electronic apparatus 100 using various programs stored in the storage 110.

The processor 120 may include, for example, and without limitation, a RAM (121), a ROM (122), a main CPU (123), a graphic processor (124), a first to nth interfaces (125-1~125-n), and a bus (126).

The RAM (121), the ROM (122), the main CPU (123), the graphic processor (124), and the first to nth interfaces (125-1~125-n) may be connected with one another via a bus (126).

The first to nth interfaces (125-1~125-n) may be connected with the above-described components. One of the interfaces may be a network interface which is connected with an external apparatus via network.

The main CPU 123 may access to the storage 110, and perform booting using an operating system (O/S) stored in the storage 110, and perform various operations using various programs stored in the storage 110.

The ROM 122 may store a command word set, etc. for booting a system. Once power is supplied in response to an input of a turn-on command, the main CPU 123 may copy the O/S stored in the storage 110 to the RAM 121 in response to a command word stored in the ROM 122, execute the O/S, and boot the system. Once the booting is completed, the main CPU 123 may copy various application programs stored in the storage 110 to the RAM 121, execute the application programs copied to the RAM 121 and perform various operations.

The graphic processor 124 may generate a screen including various objects such as an icon, an image, text, etc. using a calculation unit (not illustrated) and a rendering unit (not illustrated). The calculation unit may calculate an attribute value such as a coordinate value, a shape, a size, a color, etc. with which each object is displayed conforming to the layout of the screen based on a received control command. The rendering unit may generate a screen of a variety of layouts which includes an object based on the attribute value calculated by the calculation unit. The screen generated in the rendering unit may be displayed on a display area of the display 150.

The operation of the processor 120 described above may be performed by a program stored in the storage 110.

The storage 110 may store various data such as an operating system (O/S) software module for driving the electronic apparatus 100, a language model which includes an embedding matrix and a softmax matrix, a compression module for compressing a language model, an RNN training module, etc.

The communicator 130 may include various communication circuitry and communicate with various types of external apparatuses by a variety of communication methods. The communicator 130 may include various communication circuitry, such as, for example, and without limitation, a Wi-Fi chip 131, a Bluetooth chip 132, a wireless communication chip 133, an NFC chip 134, or the like. The processor 120 may communicate with various external apparatuses using the communicator 130.

The Wi-Fi chip 131 and the Bluetooth chip 132 may perform communication by Wi-Fi and Bluetooth, respectively. In a case of using the Wi-Fi chip 131 or the Bluetooth chip 132, the connection information such as an SSID and a session key, etc. may be transmitted and received preferentially, communication may be connected using the information and various information may be transmitted and received. The wireless communication chip 133 may refer to a chip that performs communication in accordance with various communication standards, such as IEEE, Zigbee, 3rd generation (3G), 3rd generation partnership project (3GPP), long term evolution (LTE), etc. The NFC ship 134 may refer to a chip that operates in a near field communication (NFC) method which uses a 13.56 MHz-band from among various RF-ID frequency bands, such as 135 kHz, 13.56 MHz, 433 MHz, 860 to 960 MHz, and 2.45 GHz.

The processor 120 may receive a language model which includes an embedding matrix and a softmax matrix from an external apparatus via the communicator 130.

The user interface 140 may include various interface circuitry and receive various user interactions. The user interface 140 may be implemented in various forms depending on an example embodiment of the electronic apparatus 100. For example, the user interface 140 may include, for example, and without limitation, a button provided in the electronic apparatus 100, a microphone which receives a user input, a camera which detects a user motion, or the like. Also, if the electronic apparatus 100 is implemented as a touch-based electronic apparatus, the user interface 140 may be implemented, for example, and without limitation, as a touch screen which forms an inter-layer structure with a touch pad, or the like. In this case, the user interface 140 may be used as the display 150 described above.

The audio processor 160 may include various circuitry to process audio data. The audio processor 160 may perform various processing operations such as decoding, amplifying, noise-filtering with respect to audio data.

The video processor 170 may include various circuitry to perform the processing of video data. The video processor 170 may perform various image processing operations such as decoding, scaling, noise-filtering, frame rate conversion, resolution conversion, etc.

By the method described above, the processor 120 may convert the language model which includes an embedding matrix and a softmax matrix into the language model in which the data is compressed and which includes the first projection matrix, the second projection matrix, the first matrix, the second matrix, and the third matrix with minimizing and/or reducing the performance degradation of the language model.

The method for providing a recommended word through a language model compressed as above will be described in greater detail below.

Figure 2:
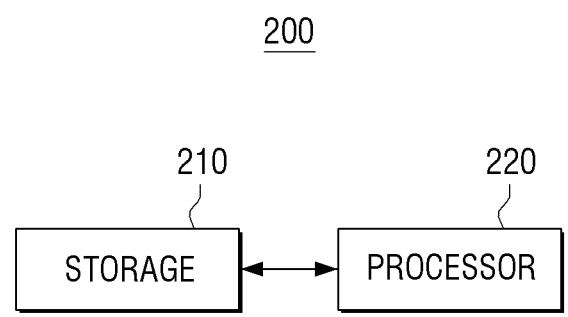
FIG. 2 is a block diagram illustrating an electronic apparatus according to another example embodiment.

FIG. 2 is a block diagram illustrating an electronic apparatus 200 in accordance with another example embodiment. As illustrated in FIG. 2, the electronic apparatus 200 may include a storage 210 and a processor (e.g., including processing circuitry) 220.

The electronic apparatus 200 may provide a recommended word. For example, the electronic apparatus 200 may receive an input of a user utterance and provide a recommended word which is subsequent to the user utterance. For instance, if the user utterance 'the today's weather is . . . ' is input, the electronic apparatus 200 may provide a recommended word such as 'fine,' 'cold,' etc.

The electronic apparatus 200 may be implemented, for example, and without limitation, as a desktop PC, a laptop, a smartphone, a tablet PC, a server, or the like. Also, the electronic apparatus 200 may be implemented as an apparatus with a small storage space.

The storage 210 may store a language model which includes the first projection matrix, the first matrix, the second matrix, and the third matrix which are used as an embedding matrix, and the second projection matrix, the first matrix, the second matrix and the third matrix which are used as a softmax matrix. The storage 210 may store a compressed language model described in FIGS. 1A and 1B.

The processor 220 may control overall operations of the electronic apparatus 200.

According to an example embodiment, the processor 220 may be implemented, for example, and without limitation, as a digital signal processor (DSP), a microprocessor, or a time controller (TCON), or the like, but is not limited thereto. The processor 220 may include, for example, and without limitation, one or more of a dedicated processor, a central processing unit (CPU), a micro controller unit (MCU), a micro processing unit (MPU), a controller, an application processor (AP), a communication processor (CP), and an ARM processor, or the like, or the processor 220 may be defined as one of the terms above. The processor 220 may also be implemented as a system-on-chip (SoC) or a large scale integration (LSI) in which a processing algorithm is provided, or as a form of field programmable gate array (FPGA), or the like.

The processor 220 may obtain the first data in which the first vector corresponding to the first word is mapped to a vector space based on the first projection matrix, the first matrix, the second matrix, and the third matrix in response to an input of the first word. For example, if the word "I" is input by a user, the processor 220 may multiply the first vector which corresponds to the word "I" by the first projection matrix, the first matrix, the second matrix, and the third matrix, and obtain the first data of a high-dimension.

The processor 220 may obtain the second vector from the first data based on the second projection matrix, the first matrix, the second matrix, and the third matrix. For example, the value of each column of the second vector may be between 0 and 1, and the sum of the values of all the columns may be 1.

The processor 220 may provide a recommended word based on the second vector. For example, the processor 220 may provide the word which corresponds to the column in which the greatest value among the values of the elements of the second vector is positioned as the first recommended word, and provide the word which corresponds to the column in which the second greatest value among the values of elements of the second vector is positioned as the second recommended word. For example, the processor 220 may provide the word "am" as the first recommended word, and recommend the word "was" as the second recommended word.

However, the example embodiments are not limited to the above example. The processor 220 may provide any different number of recommended word(s).

The processor 220 may obtain the second data in which the third vector corresponding to the second word is mapped to a vector space based on the first projection matrix, the first matrix, the second matrix, and the third matrix in response to an input of the second word after the first word is input.

For example, if the word "am" is input after the word "I" is input, the processor 220 may obtain the second data of a high dimension by multiplying the third vector which corresponds to the word "am" by the first projection matrix, the first matrix, the second matrix and the third matrix. In other words, the processor 220 may consider both the word "I" which is previously input and the word "am" which is currently input.

The processor 220 may generate the third data based on the first data and the second data. For example, the processor 220 may generate the third data based on the first data and the second data by the long-short term memory method (LSTM). The processor 220 may also generate the third data by the weighted sum of the first data and the second data.

The processor 220 may obtain the fourth vector from the third data based on the second projection matrix, the first matrix, the second matrix, and the third matrix.

For example, the processor 220 may obtain the transposed matrix of a product of the second projection matrix, the first matrix, the second matrix and the third matrix, and obtain the fourth vector by multiplying the transposed matrix by the transposed matrix from which the third data is obtained. For example, the value of each column of the fourth vector may be between 0 and 1, and the sum of the values of all the columns may be 1.

The processor 220 may provide a recommended word based on the fourth vector. For example, the processor 220 may provide the word which corresponds to the column in which the greatest value among the values of the elements of the fourth vector is positioned as the first recommended word, and provide the word which corresponds to the column in which the second greatest value among the values of the elements of the fourth vector is positioned as the second recommended word. For instance, the processor 220 may recommend the word "a" as the first recommended word, and recommend the word "busy" as the second recommended word.

However, the example embodiments are not limited to the above example. The processor 220 may receive more words and provide more recommended words. However, there may be a limitation in the number of words input in the previous time period, the words which the processor 220 refers to. For example, if a current word is input, the processor 220 may refer to only three or less words input in the previous time period.

Also, the previous time period may be within a predetermined time period from the current time. For example, if a current word is input, the processor 220 may refer to only the word which is input during the last 10 seconds.

Also, the processor 220 may receive one word and provide a recommended word. In other words, the processor 220 may not refer to the word input in the previous time period.

The electronic apparatus 200 may further include an input unit (not illustrated) and an output unit (not illustrated). The input unit may include various input circuitry and be for receiving a word from a user, and may be implemented, for example, and without limitation, as a microphone, a keyboard, or the like. The output unit may include various output circuitry and be configured to provide a recommended word, and may be implemented as, for example, and without limitation, a display, a speaker, or the like.

The structure of the processor 220 may be equivalent to the structure of the processor 120 in FIG. 1B, and thus, the detailed description thereof will not be repeated.

The electronic apparatus 200 may provide a recommended word as described above. Meanwhile, the electronic apparatus 200 may store a language model which includes the first projection matrix, the second projection matrix, the first matrix, the second matrix, and the third matrix, and accordingly, the first calculation of multiplying the first projection matrix, the first matrix, the second matrix and the third matrix which may be used as an embedding matrix, the second calculation of multiplying the second projection matrix, the first matrix, the second matrix, and the third matrix, and the third calculation of calculating the transposed matrix of the matrices which may be used as a softmax matrix based on the second calculation may be further performed. The time of such calculations may be very short, and thus, there may be no problem in providing a recommended word.

It has been described that the electronic apparatus 100 in FIGS. 1A and 1B may be a separate component from the electronic apparatus 200 in FIG. 2, but the electronic apparatuses may be implemented as one component.

The operation of an electronic apparatus for compressing a language model and the operation of the electronic apparatus for providing a recommended word will be described in greater detail below with reference to the drawings.

Figure 3A:
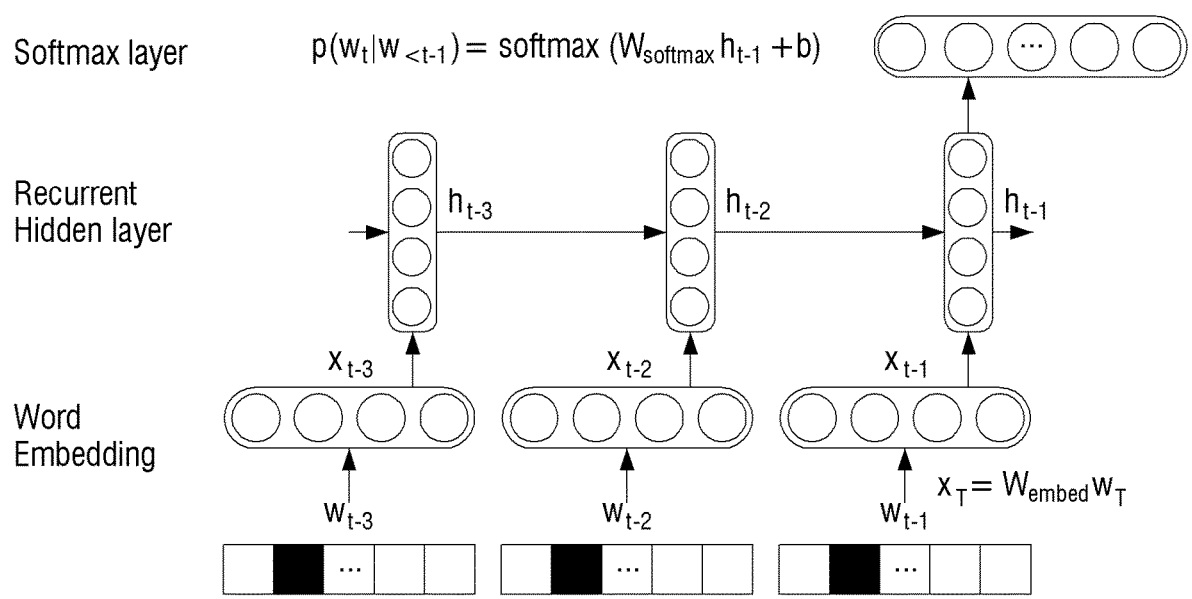

FIGS. 3A and 3B are diagrams illustrating an example of conventional RNN training.

As illustrated in FIG. 3A, the processor 120 may perform an operation of word embedding in which a vector corresponding to an input word is mapped to a vector space. An embedding matrix may be used in the word embedding.

The processor 120 may map the first word input at the time of t−3, the second word input at the time of t−2, and the third word input at the time of t−1 to a vector space sequentially, and generate the fourth data based on the first data, the second data, and the third data which are mapped to a vector space in the recurrent hidden layer stage. For example, the processor 120 may generate the fourth data based on the first data, the second data, and the third data by a long-short term memory (LSTM) method or a weighted sum method.

In the softmax layer stage, the processor 120 may convert the fourth data in the vector space into a recovery vector. A softmax matrix may be used in the conversion. The processor 120 may compare the recovery vector with the fourth word to be input at the time of t and update the elements of the embedding matrix and the softmax matrix. The above process may be referred to as a training.

FIG. 3B is a diagram illustrating the process of training with a more specific example of basic data, and FIG. 3B will be described in association with to FIG. 3A.

When the processor 120 performs the training with respect to the first sentence in FIG. 3B, the processor 120 may sequentially map the word "I" input at the time of t−3, the word "hope" input at the time of t−2, and the word "I" input at the time of t−1 to a vector space, and generate the fourth data based on the first data, the second data, and the third data which are mapped to a vector space.

The processor 120 may convert the fourth data in the vector space into a recovery vector, and compare the recovery vector with the word "shall" input at the time oft and update the elements of an embedding matrix and a softmax matrix based on the comparison. In other words, the elements of the embedding matrix and the softmax matrix may be updated to output the word "shall" in response to the words "I," "hope," and "I" being sequentially input.

Also, at the time of t+1, the words "I," "hope," and "I," and "shall" may be sequentially input, and the processor 120 may perform the training by the same method. In other words, the elements of the embedding matrix and the softmax matrix may be updated to output the word "succeed" in response to the words "I," "hope," and "I," and "shall" being sequentially input. Once the training related to one sentence is completed, the processor 120 may perform the training related to the other four sentences.

A language model may be generated so as to provide an optimal recommended word based on the training. For example, if a language model on which the RNN training related to the basic data is performed, when the word "I" is input at the time of t−1, the word "am" may be provided as a recommended word. That is because, if the word "I" is the first word in the five sentences, the second words may be "hope," "am," "did," "am," and "am," and as the word "am" is repeated three times in the process of the training, the embedding matrix and the softmax matrix may be updated such that the most appropriate recommended word subsequent to the word "I" may be "am."

FIG. 3B is provided for ease of description, and the elements of the embedding matrix and the softmax matrix may be updated by performing a training related to larger number of sentences.

Figure 4:
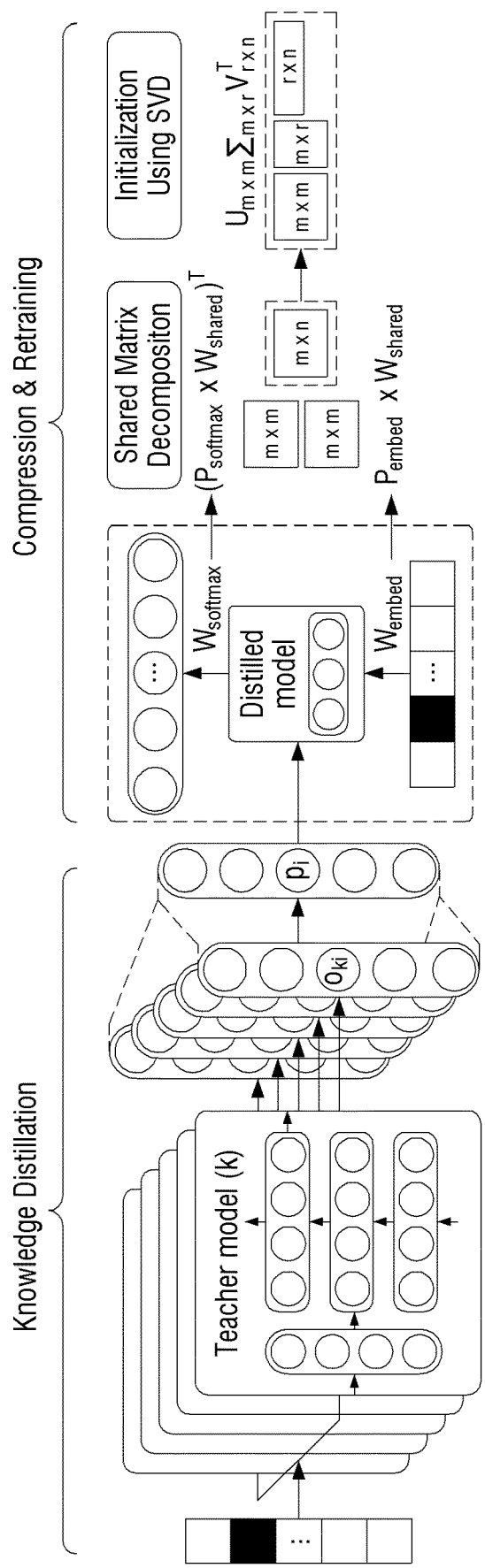
FIG. 4 is a diagram illustrating a compression method according to an example embodiment.

FIG. 4 is a diagram illustrating an example compression method in accordance with an example embodiment.

A knowledge distillation in FIG. 4 may refer, for example, to the method for generating a plurality of language models and improving the performance of the language models using an average of recommended words output from each of the plurality of language models.

A compression & retraining may refer, for example, to the method for compressing a language model including an embedding matrix and a softmax matrix, and the method may have two steps.

In the first step, the embedding matrix may be converted into a product of the first projection matrix and a shared matrix, the product having the same size as the size of the embedding matrix, the transposed matrix of the softmax matrix may be converted into a product of the second projection matrix and the shared matrix, the product having the same size as the size of the transposed matrix of the softmax matrix, update the elements of the first projection matrix, the second projection matrix, and the shared matrix by the RNN training, and determine the performance. The above process may be performed repeatedly to the shared matrices of various sizes, and the size of a shared matrix which has almost no degradation in performance and has an optimal compression efficiency may be obtained, and a primarily compressed language model may be generated using the obtained shared matrix.

In the second step, the shared matrix may be converted into the first matrix, the second matrix, and the third matrix through, for example, an SVD, and the elements of the first projection matrix, the second projection matrix, the first matrix, the second matrix, and the third matrix may be updated through the RNN training and generate a secondarily compressed language model.

FIG. 5 is a diagram illustrating the performance and compression efficiency of a compressed language model. The PP in FIG. 5 may refer, for example, to a word perplexity, and the CR may refer, for example, to a compression rate.

In a case of the base line using a basic language model, the PP may be 56.55, and the size of data may be 56.76. If the knowledge distillation (KD) in FIG. 4 is applied, the performance may be improved and the PP may become 55.76, which is more decreased than a baseline.

In a case of the shared matrix using the primarily compressed language model, the PP may be 55.07, and the size of data may be 33.87. In other words, in the case of the shared matrix, the PP may be similar to the baseline or the KD, but the size of data may be reduced by the CR, 1.68.

In a case of a low-rank and a retrain which use the secondarily compressed language model, the PP may be 59.78, and the size of data may be 14.80. In other words, in the case of the low-rank and the retrain, the PP may be increased slightly more than the PP of the baseline or the KD so that the performance may be decreased slightly, but the size of data may be reduced by the CR, 3.84. The compression rate of the low-rank and the retrain may be higher than that of the shared matrix.

The processor 120 may quantize the elements of the first projection matrix, the second projection matrix, the first matrix, the second matrix, and the third matrix from the secondarily compressed language model and generate the tertiary-compressed language model. For example, the processor 120 may quantize the elements of four bytes of the first projection matrix, the second projection matrix, the first matrix, the second matrix, and the third matrix to two bytes and generate a tertiary-compressed language model.

As illustrated in FIG. 5, in the case of the quantization in which the language model where the elements are quantized in the secondarily compressed language model is used, the PP may be 59.78, and the size of data may be 7.40. In other words, in the case of the quantization, the PP may be the same as the PP of the low-rank and retrain, and the size of the data may be reduced by the CR, 7.68. The compression rate of the quantization is higher than the compression rate of the low-rank and retrain.

As described above, the data may be compressed with minimizing and/or reducing the degradation in performance by dividing the embedding matrix and the softmax matrix into a plurality of small-sized matrices and quantizing the elements of the matrices.

Figure 6:
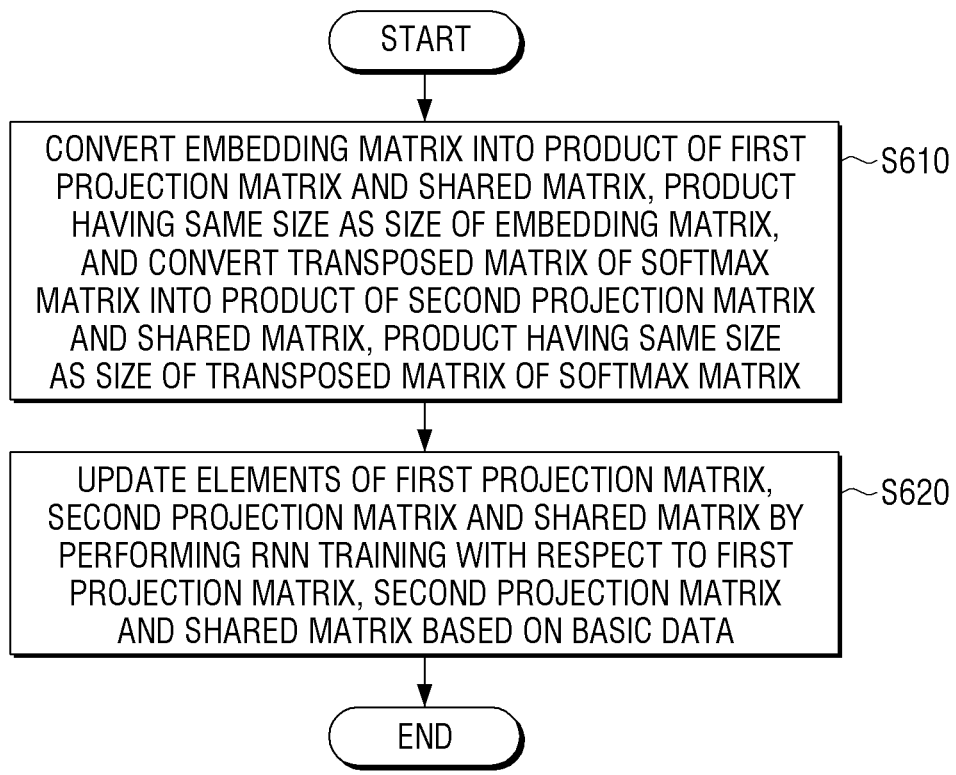
FIG. 6 is a flowchart illustrating an example operation method of an electronic apparatus for compressing a language according to an example embodiment.

FIG. 6 is a flowchart illustrating an example operation method for compressing a language model of an electronic apparatus in accordance with an example embodiment. The electronic apparatus may, for example, store a language model which includes an embedding matrix and a softmax matrix on which a recurrent neural network (RNN) training is performed based on basic data including a plurality of sentences.

The embedding matrix may be converted to a product of the first projection matrix and a shared matrix, the product having the same size as the size of the embedding matrix, and the transposed matrix of the softmax matrix may be converted to a product of the second projection matrix and the shared matrix, the product having the same size as the size of the transposed matrix of the softmax matrix (S610). The elements of the first projection matrix, the second projection matrix, and the shared matrix may be updated by performing the RNN training with respect to the first projection matrix, the second projection matrix and the shared matrix based on the basic data (S620).

The method may further include calculating a word perplexity with respect to the first projection matrix, the second projection matrix and the shared matrix based on a test module, obtaining a new shared matrix having a size larger than a size of the shared matrix in response to the word perplexity being equal to or greater than a predetermined value and obtaining a new shared matrix having a size smaller than a size of the shared matrix in response to the word perplexity being lower than the predetermined value, and recalculating the first projection matrix, the second projection matrix and the shared matrix using the obtained new shared matrix.

The method may further include calculating a reference word perplexity with respect to the embedding matrix and the softmax matrix based on the text module, and determining the predetermined value based on the reference word perplexity.

The recalculating may include recalculating the first projection matrix, the second projection matrix and the shared matrix using a shared matrix of a smallest size among a plurality of shared matrices of which word perplexities are lower than the predetermined value, and generating a compressed language model based on the recalculated first projection matrix, second projection matrix and shared matrix.

The method may further include converting the shared matrix into a first matrix, a second matrix and a third matrix using a singular value decomposition (SVD), updating elements of the first projection matrix, the second projection matrix, the first matrix, the second matrix and the third matrix by performing the RNN training with respect to the first projection matrix, the second projection matrix, the first matrix, the second matrix and the third matrix based on the basic data, and generating a compressed language model based on the first projection matrix, the second projection matrix, the first matrix, the second matrix and the third matrix of which elements are updated.

The method may further include obtaining the first data in which a first vector corresponding to the first word included in one of the plurality of sentences is mapped to a vector space based on a first random matrix, obtaining second data in which a second vector corresponding to the second word is mapped to the vector space based on the first random matrix in response to an input of the second word which is included in the sentence and is subsequent to the first word, generating third data based on the first data and the second data, obtaining a recovery vector from the third data based on the second random matrix, and updating the elements of the first random matrix and the second random matrix based on a difference between the recovery vector and a third vector corresponding to a third word subsequent to the second word and performing a training.

The method may further include updating the elements of the first random matrix and the second random matrix based on the remaining sentences of the plurality of sentences, and storing the first random matrix and the second random matrix of which elements are updated based on the remaining sentences in the storage as the embedding matrix and the softmax matrix.

The transposed matrices of the embedding matrix and the softmax matrix may have the same size.

Figure 7:
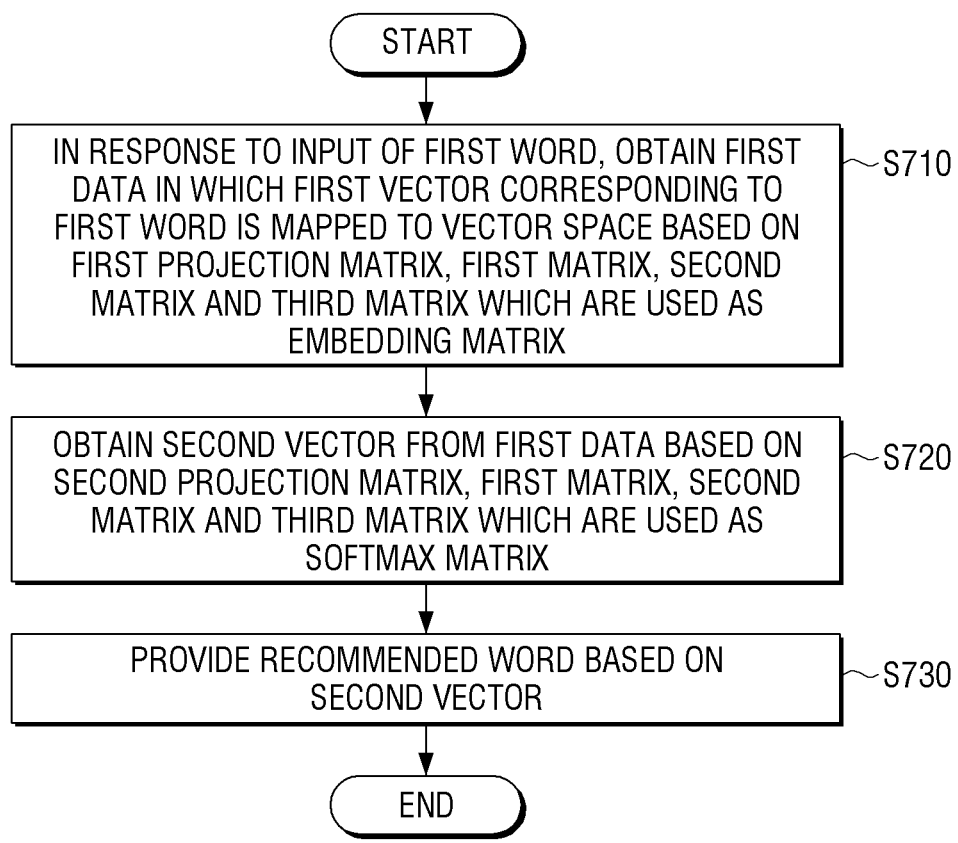
FIG. 7 is a flowchart illustrating an example operation method of an electronic apparatus for providing a recommended word according to an example embodiment.

FIG. 7 is a flowchart illustrating an example operation method of an electronic apparatus for providing a recommended word in accordance with an example embodiment. The electronic apparatus may store a language model which includes the first projection matrix, the first matrix, the second matrix and the third matrix which are used as the embedding matrix, and the second projection matrix, the first matrix, the second matrix, and the third matrix which are used as the softmax matrix.

The first data in which the first vector corresponding to the first word is mapped to a vector space based on the first projection matrix, the first matrix, the second matrix, and the third matrix which are used as the embedding matrix may be obtained in response to an input of the first word (S710). The second vector may be obtained from the first data based on the second projection matrix, the first matrix, the second matrix and the third matrix which are used as the softmax matrix (S720). The recommended word may be provided based on the second vector (S730).

The method may further include obtaining the second data in which a third vector corresponding to the second word is mapped to the vector space based on the first projection matrix, the first matrix, the second matrix, and the third matrix in response to an input of a second word after the first word is input, generating third data based on the first data and the second data, obtaining a fourth vector from the third data based on the second projection matrix, the first matrix, the second matrix, and the third matrix, and providing the recommended word based on the fourth vector.

According to one or more example embodiments described above, an electronic apparatus may compress the data of a language model on which the RNN training is performed, and an electronic apparatus which has a relatively small storage space may store the compressed language model. Further, the electronic apparatus may provide a recommended word based on the compressed language model with minimizing and/or reducing the degradation in performance.

According to an example embodiment, one or more example embodiment(s) described above may be implemented as software which includes an instruction stored in a machine-readable storage medium. A machine may call the stored instruction stored from the storage medium and operate in accordance with the called instruction, and may include an electronic apparatus in accordance with the example embodiments. If the instruction is executed by a processor, the processor may directly perform the function which corresponds to the instruction, or the function may be performed using other components under control of the processor. The instruction may include a code which may be generated or executed by a complier or an interpreter. The machine-readable storage medium may be provided in a form of a non-transitory storage medium. The 'non-transitory' may not necessarily mean that the storage medium includes a signal but may simply mean that the signal may be tangible, and the term may not signify whether data is stored semi-permanently or temporarily.

Also, according to an example embodiment, the method described in one or more example embodiment(s) may be included in a computer program product and provided. The computer program product may be a merchandise traded between a seller and a buyer. The computer program product may have a form of a machine-readable storage medium (e.g., a compact disc read only memory [CD-ROM]), or may be distributed online via an application store (e.g., a Play Store™). If the computer program product is distributed online, at least one part of the computer program product may be temporarily stored in the storage medium such as a memory of a server of a manufacturing company, a server of an application store or a relay server, or may be generated temporarily.

Various example embodiments described above may be embodied in a recording medium readable by a computer or a similar apparatus to the computer using software, hardware, or any combination thereof. In some cases, the example embodiments described above may be embodied as a processor. According to the software implementation, the example embodiments such as a procedure and function described may be embodied as separate software modules. Each of the software modules may perform one or more functions and operations described in the example embodiments.

Also, the computer instructions for performing a processing operation of an apparatus in accordance with one or more example embodiment(s) may be stored in a non-transitory computer-readable medium. The computer instructions stored in a non-transitory computer-readable medium may control a certain apparatus/device to perform a processing operation in an apparatus/device in accordance with the various example embodiments when the instructions are executed by a processor of the apparatus/device. A non-transitory computer readable medium may refer to a machine-readable medium or device which stores data. Examples of a non-transitory computer readable medium may include, without limitation, a compact disc (CD), a digital versatile disc (DVD), a hard disk, a Blu-ray disc, a universal serial bus (USB) stick, a memory card, a ROM, or the like.

Also, each of the components (e.g., a module or a program) described in one or more example embodiments above may be configured with one or a plurality of entities, and some of the aforementioned corresponding sub-components may be omitted, or other sub-components may be further included in the example embodiments. In a substitutive way or an additional way, some of the components (e.g., a module or program) may be integrated as one entity, and the function to be performed by each component before the integration may be performed equivalently or similarly. The operations performed by a module, program, or another component in accordance with various example embodiments may be implemented sequentially, in parallel, repeatedly, or heuristically, or at least some of the operations may be implemented in different order, omitted, or another operation may be added.

The foregoing example embodiments and advantages are merely examples and are not to be understood as limiting the example embodiments. The description of the example embodiments is intended to be illustrative, and not to limit the scope of the disclosure, as defined by the appended claims, and many alternatives, modifications, and variations will be apparent to those skilled in the art.

What is claimed is:

1. An electronic apparatus configured to compress a language model, the electronic apparatus comprising:
   a storage configured to store a language model including an embedding matrix and a softmax matrix generated by a recurrent neural network (RNN) training based on basic data including a plurality of sentences; and
   a processor configured to:
      convert the embedding matrix into a product of a first projection matrix and a shared matrix, the product of the first projection matrix and the shared matrix having a same size as a size of the embedding matrix, and convert a transposed matrix of the softmax matrix into a product of a second projection matrix and the shared matrix, the product of the second projection matrix and the shared matrix having a same size as a size of the transposed matrix of the softmax matrix, and
      update elements of the first projection matrix, the second projection matrix and the shared matrix by performing the RNN training with respect to the first projection matrix, the second projection matrix and the shared matrix based on the basic data.

2. The electronic apparatus of claim 1, wherein the processor is further configured to:
   determine a word perplexity with respect to the first projection matrix, the second projection matrix and the shared matrix based on a test module,
   in response to the word perplexity being equal to or greater than a predetermined value, obtain a new shared matrix having a size larger than a size of the shared matrix, and in response to the word perplexity being lower than the predetermined value, obtain a new shared matrix having a size smaller than a size of the shared matrix, and
   re-determine the first projection matrix, the second projection matrix and the shared matrix using the new shared matrix.

3. The electronic apparatus of claim 2, wherein the processor is further configured to determine a reference word perplexity with respect to the embedding matrix and the softmax matrix based on the text test module and to determine the predetermined value based on the reference word perplexity.

4. The electronic apparatus of claim 3, wherein the processor is further configured to re-determine the first projection matrix, the second projection matrix and the shared matrix using a shared matrix of a smallest size among a plurality of shared matrices having word perplexities lower than the predetermined value and to generate a compressed language model based on the re-determined first projection matrix, second projection matrix and shared matrix.

5. The electronic apparatus of claim 1, wherein the processor is further configured to:
convert the shared matrix into a first matrix, a second matrix and a third matrix using a singular value decomposition (SVD),
update elements of the first projection matrix, the second projection matrix, the first matrix, the second matrix and the third matrix by performing the RNN training with respect to the first projection matrix, the second projection matrix, the first matrix, the second matrix and the third matrix based on the basic data, and
generate a compressed language model based on the first projection matrix, the second projection matrix, the first matrix, the second matrix and the third matrix having updated elements.

6. The electronic apparatus of claim 1, wherein the processor is further configured to:
obtain first data in which a first vector corresponding to a first word included in one of the plurality of sentences is mapped to a vector space based on a first random matrix, and in response to receiving an input of a second word which is included in the sentence and is subsequent to the first word, obtain second data in which a second vector corresponding to the second word is mapped to the vector space based on the first random matrix,
generate third data based on the first data and the second data, and
obtain a recovery vector from the third data based on a second random matrix, and update elements of the first random matrix and the second random matrix based on a difference between the recovery vector and a third vector corresponding to a third word subsequent to the second word, and perform a training.

7. The electronic apparatus of claim 6, wherein the processor is further configured to:
update elements of the first random matrix and the second random matrix based on remaining sentences of the plurality of sentences, and
store the first random matrix and the second random matrix having updated elements based on the remaining sentences in the storage as the embedding matrix and the softmax matrix, respectively.

8. The electronic apparatus of claim 1, wherein transposed matrices of the embedding matrix and the softmax matrix have a same size.

9. An electronic apparatus configured to provide a recommended word, the electronic apparatus comprising:
a storage configured to store a compressed language model including a first projection matrix, a second projection matrix, a first matrix, a second matrix, and a third matrix, wherein the first projection matrix, the first matrix, the second matrix, and the third matrix are used as an embedding matrix, and the second projection matrix, the first matrix, the second matrix, and the third matrix which are used as a softmax matrix; and
a processor configured to:
in response to receiving an input of a first word, obtain first data in which a first vector corresponding to the first word is mapped to a vector space based on the first projection matrix, the first matrix, the second matrix, and the third matrix,
obtain a second vector from the first data based on the second projection matrix, the first matrix, the second matrix, and the third matrix, and
provide a recommended word based on the second vector.

10. The electronic apparatus of claim 9, wherein the processor is further configured to:
in response to receiving an input of a second word after the first word is input, obtain second data in which a third vector corresponding to the second word is mapped to the vector space based on the first projection matrix, the first matrix, the second matrix, and the third matrix,
generate third data based on the first data and the second data,
obtain a fourth vector from the third data based on the second projection matrix, the first matrix, the second matrix, and the third matrix, and
provide the recommended word based on the fourth vector.

11. The electronic apparatus of claim 9, wherein the processor is further configured to:
convert the embedding matrix into a product of the first projection matrix and a shared matrix, the product of the first projection matrix and the shared matrix having a same size as a size of the embedding matrix;
convert a transposed matrix of the softmax matrix into a product of the second projection matrix and the shared matrix, the product of the second projection matrix and the shared matrix having a same size as a size of the transposed matrix of the softmax matrix; and
convert the shared matrix into the first matrix, the second matrix and the third matrix using a singular value decomposition (SVD).

12. A method for compressing a language model of an electronic
apparatus in which a language model which includes an embedding matrix and a softmax matrix generated by a recurrent neural network (RNN) training based on basic data including a plurality of sentences is stored, the method comprising:
converting the embedding matrix into a product of a first projection matrix and a shared matrix, the product of the first projection matrix and the shared matrix having a same size as a size of the embedding matrix, and converting a transposed matrix of the softmax matrix into a product of a second projection matrix and the shared matrix, the product of the second projection matrix and the shared matrix having a same size as a size of the transposed matrix of the softmax matrix; and
updating elements of the first projection matrix, the second projection matrix and the shared matrix by performing the RNN training with respect to the first projection matrix, the second projection matrix and the shared matrix based on the basic data.

13. The method of claim 12, further comprising:
determining a word perplexity with respect to the first projection matrix, the second projection matrix and the shared matrix based on a test module;
in response to the word perplexity being equal to or greater than a predetermined value, obtaining a new shared matrix having a size larger than a size of the shared matrix, and in response to the word perplexity being lower than the predetermined value, obtaining a new shared matrix having a size smaller than a size of the shared matrix; and re-determining the first projection matrix, the second projection matrix and the shared matrix using the new shared matrix.

14. The method of claim 13, further comprising:
determining a reference word perplexity with respect to the embedding matrix and the softmax matrix based on the test module; and
determining the predetermined value based on the reference word perplexity.

15. The method of claim 14, wherein the re-determining further comprises re-determining the first projection matrix, the second projection matrix and the shared matrix using a shared matrix of a smallest size among a plurality of shared matrices of which word perplexities are lower than the predetermined value, and generating a compressed language model based on the re-determined first projection matrix, second projection matrix and shared matrix.

16. The method of claim 12, further comprising:
converting the shared matrix into a first matrix, a second matrix and a third matrix using a singular value decomposition (SVD);
updating elements of the first projection matrix, the second projection matrix, the first matrix, the second matrix and the third matrix by performing the RNN training with respect to the first projection matrix, the second projection matrix, the first matrix, the second matrix and the third matrix based on the basic data; and
generating a compressed language model based on the first projection matrix, the second projection matrix, the first matrix, the second matrix and the third matrix having updated elements.

17. The method of claim 12, further comprising:
obtaining first data in which a first vector corresponding to a first word included in one of the plurality of sentences is mapped to a vector space based on a first random matrix;
in response to receiving an input of a second word which is included in the sentence and is subsequent to the first word, obtaining second data in which a second vector corresponding to the second word is mapped to the vector space based on the first random matrix;
generating third data based on the first data and the second data;
obtaining a recovery vector from the third data based on a second random matrix; and
updating elements of the first random matrix and the second random matrix based on a difference between the recovery vector and a third vector corresponding to a third word subsequent to the second word, and performing a training.

18. The method of claim 17, further comprising:
updating elements of the first random matrix and the second random matrix based on remaining sentences of the plurality of sentences; and
storing the first random matrix and the second random matrix having updated elements based on the remaining sentences in the storage as the embedding matrix and the softmax matrix, respectively.

19. The method of claim 12, wherein transposed matrices of the embedding matrix and the softmax matrix have a same size.

* * * * *